United States Patent [19]

Waldrum

[11] Patent Number: 5,020,725

[45] Date of Patent: Jun. 4, 1991

[54] MANUAL SPRAY APPARATUS

[76] Inventor: John E. Waldrum, 349 Fairview Ave., Ambler, Pa. 19002

[21] Appl. No.: 356,070

[22] Filed: May 24, 1989

[51] Int. Cl.$^5$ .................................................. B05B 3/10
[52] U.S. Cl. ..................................... 239/154; 239/223; 222/175; 222/333; 322/1
[58] Field of Search ............... 239/152, 153, 154, 214, 239/222.11, 223, 224, 289; 290/1 R; 322/1; 222/175, 333

[56] References Cited

U.S. PATENT DOCUMENTS

| 383,016 | 5/1888 | Scribner | 290/1 R |
|---|---|---|---|
| 3,648,935 | 3/1972 | Waldrum | 236/689 |
| 4,645,128 | 2/1987 | Graber | 239/223 |
| 4,647,835 | 3/1987 | Fujikawa et al. | 322/1 |
| 4,746,806 | 5/1988 | Campagnuolo et al. | 290/1 R |
| 4,790,483 | 12/1988 | Gill | 239/224 |
| 4,801,088 | 1/1989 | Baker | 222/333 |
| 4,807,813 | 2/1989 | Coleman | 239/153 |

Primary Examiner—Andres Kashnikow
Assistant Examiner—Christopher G. Trainor
Attorney, Agent, or Firm—Eckert Seamans Cherin & Mellott

[57] ABSTRACT

A manual, portable spray apparatus is disclosed to enable a worker to spray fields in a remote area where batteries may be difficult to obtain. The apparatus includes a portable chemical liquid storage tank, from which gravity feeds agricultural liquid chemicals to a rotary spray head. The spray head is powered by a small electric motor which receives its electrical current from a portable dynamo. The portable dynamo is rotated by a portable gear train which in turn is functioned by a hand crank. The worker can maintain spraying operations by rotating the crank as he walks and by applying the rotary spray head to the desired areas to be sprayed as the entire apparatus is moved. The dynamo output can be connected to accessory electrical or electronic equipment such as a radio transmitter, a transistor radio or a lamp to thereby achieve maximum utility under all conditions of use.

11 Claims, 2 Drawing Sheets

MANUAL SPRAY APPARATUS

BACKGROUND OF THE INVENTION

1. Field of the Invention

This invention relates generally to the field of agricultural liquid spray apparatus, and more particularly, is directed to a portable system including a manually operated dynamo suitable to function a rotary spray head and auxiliary equipment to facilitate the manual application of liquid agricultural chemicals in an efficient manner.

2. Discussion of the Prior Art

Mechanisms to aid in the application of liquid and granular agricultural chemicals to gardens, fields and other surface areas have long been a popular subject matter for prior workers in the art. Numerous types of mechanical devices have been developed to spread the agricultural chemicals and these devices have been both manually and mechanically operated. More recently, the apparatus and equipment has tended to be quite complicated in nature and expensive in manufacture and operation. Most presently available types of spray apparatus have been designed for use with various types of vehicles including aircraft and such known equipment has proven to be both efficient and effective to relatively uniformly apply the desired chemicals.

Agricultural chemical application equipment has also been particularly designed for manual use by an individual and it is in this particular area that the present invention finds special utility. For example, in U.S. Pat. No. 3,648,935 by the inventor of the present invention, a spray apparatus with a rotary movable head has been disclosed. In the apparatus described in U.S. Pat. No. 3,648,935, the movable spray head is rotatively powered through apparatus including ground contacting wheels so that as the apparatus is moved over the ground surface, the wheels generate rotary forces sufficient to rotate the rotary spray head. In other applications, the rotary spray head has been removed from the ground contacting apparatus and has instead been equipped with a small electric motor. Upon equipping the small motor with a suitable battery or batteries, a worker can walk over the ground surface while spraying and the electric motor will provide the rotary energy necessary to turn the spray head for agricultural chemical application purposes.

Such manually carried, battery powered spray apparatus has become quite popular in relatively backward or third world countries and has been widely distributed by one agricultural chemical manufacturer under the trademark "HERBIE". While this device has proved to be highly effective in such areas and efficient when in use, it has been found by farm and plantation operators in third world countries that the "HERBIE" type apparatus is frequently out-of-service and inoperable due to battery run down and the lack of a convenient source of supply for replacement batteries. In addition to the loss of battery power due to the usual and proper use of the apparatus, it has developed that the agricultural farm workers in such areas have a tendency to use the batteries for other purposes, such as for portable radios and the like. Accordingly, when it comes time to work, the spray apparatus frequently cannot function due to the lack of suitable battery power.

SUMMARY OF THE INVENTION

The present invention relates generally to manual agricultural chemical spray apparatus, and more particularly, is directed to a completely self-contained spray system that will enable a farm worker in a third world country to manually generate sufficient power for spray head rotation as the worker progresses through the fields on foot.

The manual spray apparatus of the present invention comprises generally a rotary spray head which is driven by a small electric motor in known manner. A small, manual, light weight dynamo or generator is provided in a manner to be comfortably worn by the worker wherein the output from the dynamo can be fed directly to the spray head motor to thereby rotate the spray head under all conditions of use when the dynamo is operated.

Additionally, the output of the dynamo is calculated to be sufficient to simultaneously feed a transmitter or similar apparatus whereby radio signals can be automatically generated at all times when the dynamo is in operation. A plantation owner or farm boss can be equipped with a compatible radio receiver to receive the radio signals transmitted by each manual spray system to thereby readily monitor the operation and output of each of the workers in the field.

In accordance with the teachings of this invention, a "HERBIE" type spray head can be affixed at the end of a suitable applicator handle to facilitate aiming or placement of the rotary spray head as the worker proceeds through the fields. The worker, in known manner will carry a liquid chemical containing tank on his back. A gravity outlet is provided from the tank to the spray head whereby the liquid agricultural chemical will flow by gravity to the spray head for application in a rotary pattern in known manner when the spray head is operated. A suitable small dynamo or generator with manual handle is equipped with straps for affixing to the waist or other portion of the body of the worker. In this manner, the worker can easily rotate the dynamo crank or handle with one hand as he walks while the spray head itself can be directed by the worker's other hand as he progresses through the field to be sprayed. A small radio transmitter of known design receives power from the dynamo and continuously emits a coded signal to thereby continuously indicate that the dynamo crank is being turned and that the worker is progressing through the fields. When the worker stops for a rest, the dynamo handle will not be turned and consequently the radio signal will be interrupted. If desired, other small electrical appliances, for example, lamps could also be provided and connected to the dynamo output. In this manner, electric lighting facilities can be provided in out of the way areas which might not otherwise have electric lighting capability during evening hours when the spray equipment would not ordinarily be in use. The lamp or lamps could also be utilized to provide sufficient light to permit night spraying.

It is therefore an object of the present invention to provide an improved manual agricultural spray apparatus of the type set forth.

It is another object of the present invention to provide a novel manual spray apparatus comprising an electric motor powered spray head and a small, portable, hand operated dynamo that is capable of supplying sufficient electric power to rotate the spray head as a worker proceeds through the field.

It is another object of the present invention to provide a novel, manual agricultural spray apparatus comprising a motor operated spray head, a hand operated dynamo supplying electric energy for the spray head motor, a radio transmitter drawing its energy requirements from the dynamo output and a radio receiver to receive the radio signal from the radio transmitter.

It is another object of the present invention to provide a novel manual spray apparatus that is rugged in construction, inexpensive in manufacture and trouble free when in use.

Other objects and a fuller understanding of the invention will be had by referring to the following detailed description when considered in connection with the accompanying drawings wherein like reference characters are used to designate similar parts throughout.

DESCRIPTION OF THE PREFERRED EMBODIMENT OF THE INVENTION

Figure 1:
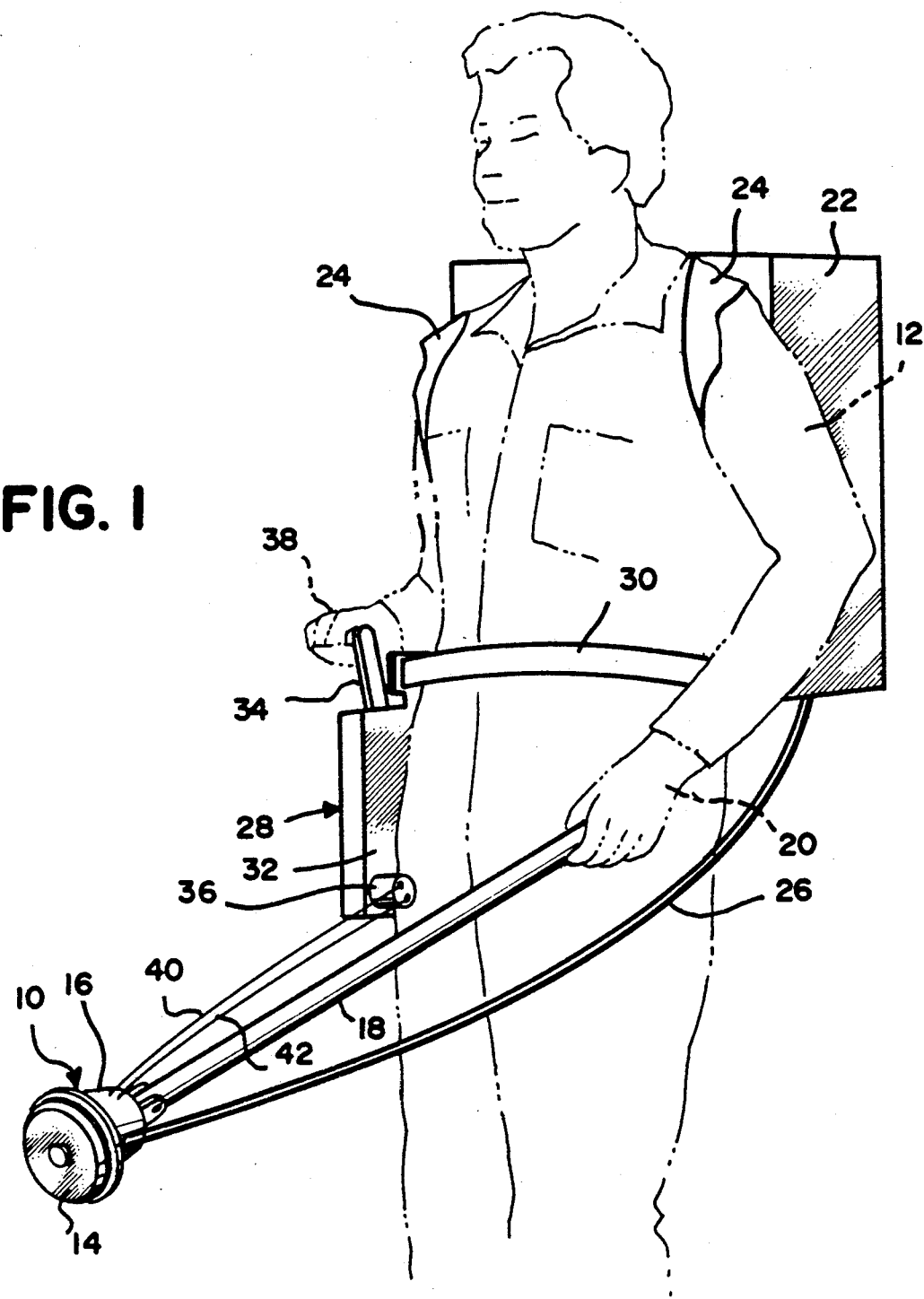
FIG. 1 is a perspective view showing a worker using the manual spray apparatus of the present invention.

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIG. 1 the manual agricultural spray apparatus 10 of the present invention in use by an agricultural field worker 12. In well known manner, the spray apparatus 10 may be of the "HERBIE" type and comprises a rotary spray head 14 which is rotatably driven by a directly connected, small electric motor 16. The spray head 14 may be affixed at the end of a suitable elongated handle 18 to permit accurate application of the liquid agricultural chemical (not shown) to the ground surface by the worker using one hand, for example, his left hand 20. A liquid chemical containing tank or reservoir 22 can be carried by the worker 12 in known manner, for example, by securing the tank or reservoir 22 upon his back by employing usual straps 24 or other known types of reservoir attaching facilities. A flexible conduit 26 communicates between the bottom of the tank or reservoir 22 and the spray head 14 to provide a continuous gravity flow of liquid agricultural chemical (not illustrated) for spraying at all times when the spray head 14 is being rotated by the motor 16.

As illustrated, a hand operated generator or dynamo 28 is provided as part of the spray apparatus and can be conveniently secured to the worker in any comfortable, known manner, for example, by employing an adjustable belt 30. The generator or dynamo system 28 comprises a simple enclosure or gear box 32 having a speed increasing gear train therewithin and a manual crank or handle 34 to rotate the gears of the gear train in a controlled and deliberate manner. The output of the gear train 66, 67, 68 (FIG. 2) in turn is connected to a small output dynamo 36 of size suitable to provide sufficient power to energize the electric motor 16 to rotate the spray head 14.

Inasmuch as only small quantities of electrical energy will be required to function the motor 16 and the spray head 14, the dynamo 36 can conveniently be as a previously known and manufactured item, such as a usual bicycle generator which has long been designed and employed for use with bicycles to energize such low power requirement equipment as a bicycle lamp. The output of the bicycle type dynamo 36 should match the power input requirements of the spray head motor 16 so that the electrical energy supplied will rotate the spray head 14. The generator or dynamo 36 can be connected to the gear train output in known manner whereby there is considerable mechanical advantage between the input provided by the right hand 38 of the worker 12 as he rotates the crank or handle 34 while walking through the field. The slow rotative speed of the crank 34 as turned by the hand 38 of the worker 12 will be increased through the gear train to an output speed sufficient to efficiently function the generator or dynamo system 28. Accordingly, when the worker 12 proceeds along his assigned route, by rotating the crank or handle 34, sufficient quantities of energy can be generated at the dynamo 36 to rotate the spray head 14 to thereby cause the desired spraying operation to proceed. When the crank is not turned, then there will be no output from the dynamo or generator 36 and the spray head 14 will not be rotated.

A pair of wires 40, 42 interconnect the generator 36 output with the input to the electric motor 16 in known manner and sufficient length of wire is provided so as not to interfere with the placement and positioning of the spray head 14 as the worker 12 proceeds through the fields. If desired, the wires 40, 42 can be affixed either interiorly or exteriorly to the spray head elongated handle 18 to protect the wires and to minimize the chances of mechanical injury to the wires.

Figure 2:
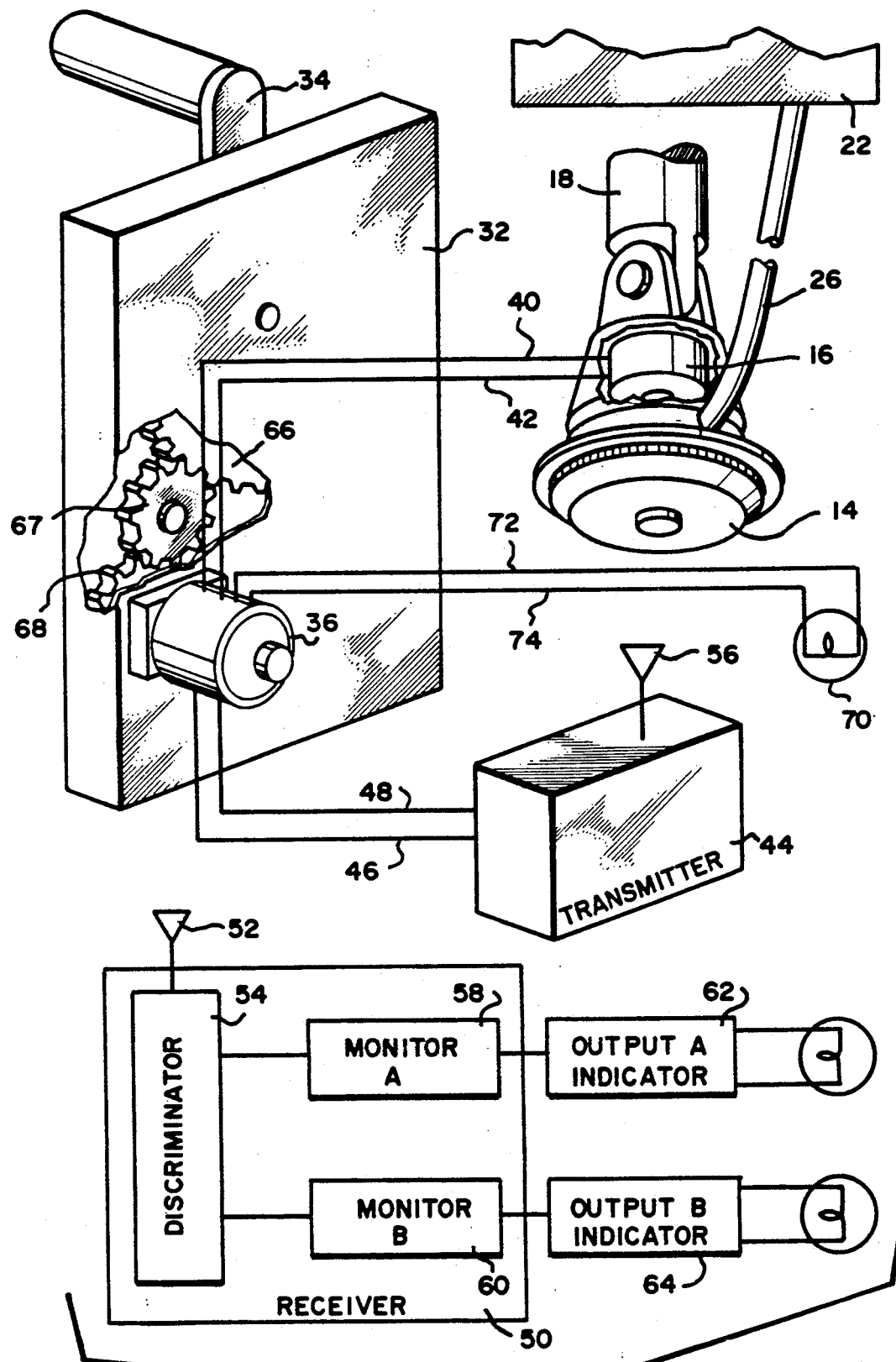
FIG. 2 is a perspective drawing, partially schematic, showing the details of construction of the manual spray apparatus and partly broken away to expose interior construction details.

Referring now to FIG. 2 and additionally considering FIG. 1, it will be seen that the output from the dynamo 36 can be utilized to function additional types of electrically powered apparatus. In one alternate construction, a large lamp 70 could be connected to the dynamo output by wires 72, 74 whereby sufficient light could be produced by the lamp 70 to illuminate portions of the field to be sprayed to enable the spray apparatus 10 to be utilized after dark for nighttime spraying. In the embodiment illustrated, a small radio transmitter 44 is powered by the dynamo 36 and is connected to the dynamo output through usual electrical wires 46, 48 to develop a continuously transmitted radio signal in well known manner. Preferably, the signal generated by the transmitter 44 can be coded in known manner so that a single, common receiver 50 of known construction can pick up and distinguish the coded signals generated by a plurality of working transmitters. In this manner, the radio signals of a number of transmitters 44 which may be positioned in various parts of a plantation or field, depending upon the chore assigned to each of a number of workers can be received, discriminated and easily identified.

The receiver 50 can be of well known suitable design and comprises essentially an antenna 52 of known design suitable to receive radio signals emitted through the antenna 56 of the transmitter 44. The generated radio signals are received in the receiver 50 at a discriminator 54 of known type wherein the discriminator functions to distinguish between the variously coded incoming signals. The discriminator 54 feeds the information to a plurality of monitors 58, 60, etc. in known manner.

In turn, each monitor output can be connected individually to one of a plurality of known type indicators or annunciators 62, 64, etc. whereby a single foreman or plantation owner can immediately determine when some or all of the field workers are no longer generating electricity and so can no longer be spraying their assigned fields. While only two monitors 58, 60 and only two annunciators 62, 64 are illustrated, it will be appreciated that any number of similar monitors and annunciators can be added in well known manner to accommodate and receive the transmitted radio signals generated by any number of field workers.

If desired, additional power take offs can be provided at the dynamo 36 to power other small pieces of electrical apparatus, for example lamps, transistor radios, etc. All that would be required would be to attach additional wires 72, 74 to the dynamo output and so long as the dynamo was designed of sufficient capacity, all of the attached electrical apparatus could be simultaneously functioned. Alternately, in remote areas, in the evenings after work hours, the spray head motor 16 and the transmitter 44 could be disconnected from the dynamo outlet and the worker could then have a ready source of small electrical current supply to power small items such as lights 70, transistor radios and other small electric appliances requiring minimum electric input.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A manual, portable spray apparatus comprising
   an agricultural chemical, rotary spray head;
   a small electric motor connected to rotatively drive the spray head when the motor is energized;
   a liquid chemical containing tank feeding liquid chemical to the spray head through an intercommunicating conduit; a hand rotated dynamo having an output and being adapted to power the electric motor, the dynamo producing an electrical current at the dynamo output when the dynamo is turned;
   a speed changing gear train having an input and an output, the dynamo being connected to the gear train output; electrical conveying means interconnecting the output dynamo with an input of the electric motor to cause rotation of the electric motor upon rotation of the dynamo; and
   an electrical appliance connected to the dynamo output, the electrical appliance generating an electrical impulse upon receiving sufficient electrical current from the dynamo,
   the electrical appliance being a radio transmitter and the electrical impulse being a radio signal;
   whereby, the electric motor and the rotary spray head are rotated when the dynamo is rotated to generate the electric current to energize the electric motor.

2. The manual, portable spray apparatus of claim 1 wherein the radio signal is a coded radio signal.

3. The manual, portable spray apparatus of claim 2, further comprises a receiver receiving the said radio signal.

4. The manual, portable spray apparatus of claim 3 further comprises a second portable spray apparatus, the second apparatus producing a second coded radio signal.

5. The manual, portable spray apparatus of claim 4 wherein the receiver comprises a discriminator to discriminate one coded radio signal from the second coded radio signal.

6. A manual, portable spray apparatus adapted to be carried by a single worker comprising
   an agricultural chemical storage tank adapted to be transported by the worker;
   a tank outlet and a conduit connected to the outlet to lead liquid chemical from the storage tank;
   a spray head connected to the conduit and adapted to receive the liquid chemical from the storage tank, the spray head comprising a rotating liquid spray element and an electric motor connected to rotate the spray element;
   electricity generating means to feed electric current to the spray head to rotate the spray element,
      the electricity generating means comprising a hand operated crank to supply input rotative energy and a dynamo rotated by the input rotative energy, the dynamo having an output, the dynamo output being electrically connected to the spray head motor to cause motor rotation when the hand crank is rotated;
   a speed increasing gear train interconnected between the hand operated crank and the dynamo to cause the dynamo to rotate at a faster speed than the hand operated crank; and
   a radio transmitter connected to the dynamo output, the radio transmitter transmitting a radio signal when the hand operated crank is turned.

7. The manual, portable spray apparatus of claim 6 further comprises an electric lamp connected to the dynamo output.

8. The manual, portable spray apparatus of claim 6 further comprises a receiver receiving the radio signal.

9. The manual, portable spray apparatus of claim 8 wherein the radio signal is coded.

10. The manual, portable spray apparatus of claim 9 wherein the receiver comprises a discriminator, the discriminator being adapted to identify the coded signal.

11. The manual, portable spray apparatus of claim 10 wherein the receiver comprises a plurality of monitors, the monitors each functioning as an indicator in response to a particular received and identified coded radio signal.

* * * * *